United States Patent
Guo et al.

(10) Patent No.: US 9,281,898 B2
(45) Date of Patent: Mar. 8, 2016

(54) MACH-ZEHNDER MODULATOR BIAS CONTROL FOR ARBITRARY WAVEFORM GENERATION

(71) Applicant: Futurewei Technologies, Inc., Plano, TX (US)

(72) Inventors: Qing Guo, Dublin, CA (US); Jianfeng Wang, Santa Clara, CA (US); Fei Zhu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 17 days.

(21) Appl. No.: 14/183,767

(22) Filed: Feb. 19, 2014

(65) Prior Publication Data

US 2015/0236790 A1    Aug. 20, 2015

(51) Int. Cl.
*H04B 10/50* (2013.01)
*H04B 10/516* (2013.01)
*H04B 3/46* (2015.01)

(52) U.S. Cl.
CPC ............ *H04B 10/5053* (2013.01); *H04B 3/464* (2013.01); *H04B 10/50575* (2013.01); *H04B 10/5161* (2013.01)

(58) Field of Classification Search
CPC .................................................. H04B 10/50575
See application file for complete search history.

(56) References Cited

U.S. PATENT DOCUMENTS

| 2002/0001116 | A1* | 1/2002 | Kajiya et al. | 359/187 |
|---|---|---|---|---|
| 2006/0127102 | A1* | 6/2006 | Roberts et al. | 398/182 |
| 2012/0288284 | A1* | 11/2012 | Yoshida et al. | 398/186 |

OTHER PUBLICATIONS

Cho, P., et al., "Closed-Loop Bias Control of Optical Quadrature Modulator", IEEE Photonics Technology Letters, vol. 18, No. 21, Nov. 1, 2006, pp. 2209-2211.
Dou, L., et al., "Electronic Pre-Distortion Operating at 1 Sample/symbol with Accurate Bias Control for CD Compensation", OThT4. pdf, Optical Fiber Communication (OFC), collocated National Fiber Optic Engineers Conference, 2010 Conference on (OFC/NFOEC), Mar. 21-25, 2010, 3 pages.
Sotoodeh, M., et al., "Modulator Bias and Optical Power Control of Optical Complex E-Field Modulators", Journal of Lightwave Technology, vol. 29, No. 15, Aug. 1, 2011, pp. 2235-2248.
Yoshida, T., et al., "A Study on Automatic Bias Control for Arbitrary Optical Signal Generation by Dual-parallel Mach-Zehnder Modulator", Tu.3.A.6, Optical Communication (ECOC), 36th European Conference and Exhibition on Optical Communication, Sep. 19-23, 2010, Torino, Italy, 3 pages.

* cited by examiner

*Primary Examiner* — Shi K Li
*Assistant Examiner* — Mina Shalaby
(74) *Attorney, Agent, or Firm* — Conley Rose, P.C.; Grant Rodolph; Adam J. Stegge

(57) ABSTRACT

A method comprising applying an In-phase (I) offset to an I component of an orthogonal pseudo-random coded direct current (DC) bias signal, applying a Quadrature-phase (Q) offset to a Q component of the orthogonal pseudo-random coded DC bias signal, applying an I dither signal to an I Mach-Zehnder modulator (MZM), wherein the I dither signal is based on the I component of the orthogonal pseudo-random coded DC bias signal, applying a Q dither signal to a Q MZM, wherein the Q dither signal is based on the Q component of the orthogonal pseudo-random coded DC bias signal, and performing arbitrary waveform generation (AWG) by modulating an analog data signal onto an optical carrier signal via the MZMs, wherein the I offset and the Q offset are selected to mitigate crosstalk between the I MZM and the Q MZM due to a finite extinction ratio.

17 Claims, 6 Drawing Sheets

MACH-ZEHNDER MODULATOR BIAS CONTROL FOR ARBITRARY WAVEFORM GENERATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The employment of higher-order modulation in terabit optical fiber transmission systems may be a way of increasing spectral efficiency and making better use of transmission capacity of currently existing fiber infrastructure. However, transmission signal quality and transmission channel impairments may become more critical for performance of higher-order modulation systems. Advances in high speed analog-to-digital converters (ADCs) and deep submicron semiconductor processing technologies in digital signal processors (DSPs) may enable advanced digital signal processing techniques to be applied for signal conditioning and/or distortion compensation at optical transmitters and/or receivers.

SUMMARY

In one embodiment, the disclosure includes an optical transmitter comprising a plurality of Mach-Zehnder modulators (MZMs) configured to modulate analog data signals onto an optical carrier signal for transmission, and an MZM bias controller coupled to at least one of the MZMs and configured to bias the MZMs with orthogonal pseudo-random code based dither signals to suppress noise associated with operation of the MZMs.

In another embodiment, the disclosure includes a method comprising generating an In-phase (I) bias signal by receiving a measured I portion of a control signal from an I MZM, offsetting the I portion of the control signal by an I offset, and applying an I dither signal to the I portion the control signal, wherein the I dither signal is based on orthogonal pseudo-random codes, generating a Quadrature-phase (Q) bias signal by receiving a measured Q portion of the control signal from a Q MZM, offsetting the Q portion of the control signal by a Q offset, and applying a Q dither signal to the Q portion the control signal, wherein the Q dither signal is based on orthogonal pseudo-random codes, applying the I bias signal to the I MZM, applying the Q bias signal to the Q MZM, and performing arbitrary waveform generation (AWG) by modulating an analog data signal onto an optical carrier signal via the MZMs, wherein the I offset and the Q offset are selected to mitigate crosstalk between the I MZM and the Q MZM due to a finite extinction ratio.

In yet another embodiment, the disclosure includes an MZM bias controller comprising an input port configured to receive a control signal from a detector associated with an MZM output, a processing unit coupled to the input port and configured to obtain I, Q, and phase component from the received control signal, apply an I offset to the I component of the control signal, apply a Q offset to the Q component of the control signal, and apply at least one orthogonal pseudo-random code based dither signal to the I component, the Q component, and the phase component of the control signal, and one or more output ports coupled to the processing unit and configured to bias an I MZM with the I component of the control signal, bias a Q MZM with the Q component of the control signal, and bias an output of at least one of the MZMs with the phase component of the control signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
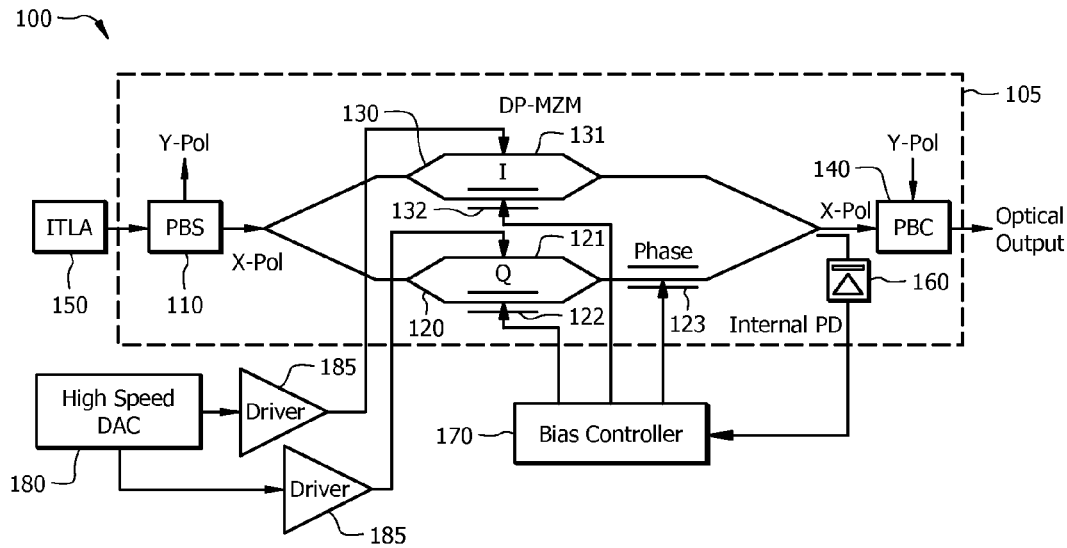
FIG. 1 is a schematic diagram of an embodiment of a Dual Parallel Mach-Zehnder Modulator (DP-MZM) based optical transmitter (Tx).

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Modulators in a Tx may comprise electrical contacts that may be activated and/or deactivated to selectively change an optical carrier wave (e.g. light) phase and/or amplitude passing through an optical medium. Such selective change in phase and/or amplitude may be employed to modulate a data signal into the optical carrier wave. Electrical signals may be converted between analog and digital formats prior to modulation, which may result in quantization error. Modulators may employ a dither signal and/or other biasing control techniques to maintain address signal drift and maintain the signal at an optimal position. Development of high-speed digital-to-analog converters (DACs) (e.g. >10 giga-samples per second (GSps)) may allow Txs to employ digital signal processing algorithms to pre-compensate for various distortions associated with components and transmission over an optical medium. Distortion pre-compensation and/or the creation of higher order modulated signals may result in generation of arbitrary analog waveforms from the Tx instead of a two level Quadrature phase-shift keying (QPSK) waveform. The introduction of arbitrary analog waveforms may place additional constraints on modulation bias control. For example, AWG may require more accurate bias control than two level QPSK waveform generation. A dither signal may be required to remain below about 1% of peak to peak voltage (Vpp) to prevent interference with signal data. AWG may employ a smaller Vpp than QPSK, which may require a weaker dither signal be employed. Smaller dither signals may reduce bias control stability and may require greater bias control accuracy to compensate for the reduced stability. Reduced bias control stability may also increase negative effects associated with imperfect MZM manufacture (e.g. MZM extinction ratio (ER)), which may also require more accurate compensation techniques.

Disclosed herein are mechanisms to increase bias control stability and minimize the impact of finite MZM ER. An MZM bias controller may bias an MZM using an orthogonal pseudo-random code based signal. The orthogonal pseudo-random codes may be generated by a hardware component and/or by a DSP, converted into an analog signal, and forwarded to the MZM bias controller for use as a dither signal. The orthogonal pseudo-random codes may be multiplied by additional pseudo noise codes and/or added to a Direct Current (DC) bias based on a measured output of the MZM. The resulting bias signal may exhibit greatly increased signal accuracy during AWG. Further, a high-order modulated signal (e.g. 16 Quadrature Amplitude Modulation (16QAM)) may comprise an I component and a Q component, where the I component and the Q component comprise a phase difference of about n/2 (e.g. ideally about 90 degrees). DP-MZMs may employ an I MZM for modulating a signals I component and a Q MZM for modulating a signals Q component. Each DP-MZM may channel differing ratios of light to the two arms of the I MZM and the Q MZM (e.g. an ER) due to inherent variances in manufacturing processes. A programmable I offset and a programmable Q offset may be added to the DC bias signal to compensate for the ER, which may result in a more accurate signal than a DP-MZM biased at a null value.

FIG. 1 is a schematic diagram of an embodiment of a DP-MZM based optical Tx 100. The Tx 100 modulates a light beam using an optical carrier's amplitude, phase, and/or polarization. The Tx 100 may comprise a DP-MZM 105, which may comprise a polarization beam splitter (PBS) 110, a Q optical modulator 120, an I optical modulator 130, and a polarization beam combiner (PBC) 140, which may be coupled as shown in FIG. 1. An integrateable tunable laser assembly (ITLA) 150 may transmit an optical carrier through the Q modulator 120 and the I modulator 130 via the PBS 110. The modulators may modulate a data signal received from high speed DAC 180 onto the optical carrier. The optical signals may be combined for transmission at PBC 140. A bias controller 170 may monitor the output of the modulators 120 and 130 via a photo-diode (PD) 160 and apply bias signals to the modulators 120 and 130.

The ITLA 150 may be any tunable laser configured to transmit an optical carrier signal over an optical medium. The ITLA 150 may be coupled to the DP-MZM 105 via an optical channel and may continuously transmit the optical carrier signal. The PBS 110 may be any optical device configured to split a light beam generated by a laser or other optical source, such as ITLA 150, into two or more light beams and guide the light beams to associated modulator(s). An example optical carrier signal may comprise orthogonal X and Y polarized signals. The PBS 110 may forward the X polarized signal to the DP-MZM 105 modulators and the Y polarized signal to a similar DP-MZM (not shown) for modulation in a manner substantially similar to DP-MZM 105.

The X polarized optical signal from PBS 110 may be split between the Q modulator 120 and the I modulator 130. Ideally, the light from PBS 110 would be evenly split between modulator 120 and 130. However, manufacturing imperfections may result in variations from an even light split, known as ER, which may be defined by the equation $ER = 20 * \log 10((1+\gamma)/(1-\gamma))$, where $\gamma$ is related to optical signal power split ratio. In an ideal case, the ratio would be 50% to Q modulator 120 and 50% to I modulator 130, resulting in a $\gamma$ of 1. ERs for Q modulator 120 and I modulator 130 are defined similarly as above. The Q modulator 120 may comprise a data path 121 with an electrode, which may be employed to modulate data from an electrical signal onto the optical carrier signal. The data path 121 may receive the electrical signal comprising the data from a high speed DAC 180 via driver(s) 185. The electrical signals on the electrode of data path 121 may cause the data path 121 to selectively vary phase and/or amplitude of optical signals from ITLA 150, resulting in a modulated optical signal. The Q modulator 120 may also comprise a bias path 122, where a bias signal comprised of a DC component and a dither signal may be applied to the Q modulator. The bias signal may modulate the optical carrier signal passing through bias path 122. The bias signal may be received from a bias controller 170. The Q modulator 120 may combine the optical signal from the two paths 121 and 122 to create a Q component optical signal. The I modulator 130 may be coupled to paths 131 and 132, which may be substantially similar to paths 121 and 122. The I modulator 130 may be configured to create an I component optical signal in a manner substantially similar to the Q modulator 120. The Q modulator 120 may also comprise a phase bias input 123, which may be employed to bias the phase of the Q component to maintain a substantially constant phase difference with respect to the I component. The phase bias input 123 may bias the Q component based on input from the bias controller 170. It should be noted that a phase bias input may also be added to the I modulator 130 for greater phase control at the expense of increased component complexity.

The PD 160 may be any light detection system. The PD 160 may be configured to capture and/or measure a portion of the combined output of the Q modulator 120 and the I modulator 130 (e.g. the optical carrier signal with both the I component and Q component) and forward the measured portion of the signal to the bias controller 170. The bias controller 170 may be any device configured to receive the measured portion of the signal from the PD 160 and alter the bias signals to the bias paths 122 and 132 and phase bias input 123 based on the measurements of PD 160. As such, PD 160 and bias controller 170 may act as a control system for DP-MZM 105 and may dynamically measure and alter the outputs of modulators 120 and 130 to ensure the output of the DP-MZM 105 remains within pre-determined specifications. It should be noted that a bias controller 170 may be implemented as a dedicated circuit, as a DSP, or combinations thereof.

The PBC 140 may be any optical device configured to generate a polarization multiplexed signal by combining modulated signals. For example, the PBC 140 may combine the X-polarized modulated optical signal, comprising the I component and the Q component, from modulators 120 and 130 with a Y-polarized modulated optical signal from another DP-MZM (not shown), which may comprise an additional I component and Q component processed in substantially the same manner as the X-polarized modulated optical signal discussed above. The combined optical signal may be transmitted as optical output across an optical medium, such as a fiber, towards a corresponding optical receiver.

DP-MZM 105 may be used in conjunction with high-speed DAC 180 to generate arbitrary waveforms, which may precompensate for bandwidth limitations, component imperfection, chromatic dispersion, etc., and/or generate higher-order modulation waveform like 16QAM. In comparison to two-level Dual-polarization quadrature phase shift keying (DP-QPSK) signals, DP-MZM 105 may require high bias control accuracy for AWG. The DP-MZMs may be driven by a multi-level driving voltage applied by drivers 185, which may be controlled by data generator via the high speed DAC 180. For example, a data generator may map data information to symbols according to a designated high-order modulation format, form multi-level I and Q signals in a digital domain, convert the digital I and Q signals into analog electrical signals via DAC 180, amplify the electrical signals via drivers 185 (e.g. RF amplifiers), and feed the multi-level electrical signals to the modulators 120 and 130. Due to implementation imperfections, such as optical and/or RF components with limited bandwidth and/or non-linear responses, multi-level electrical signals with imperfect levels, and/or MZM bias drift, the transmitted signal may deviate from the designed levels despite best efforts in signal pre-conditioning, signal biasing, etc., for example, due to ER, non-ideal phase offsets, non-ideal signal amplitudes, etc.

Figure 2:
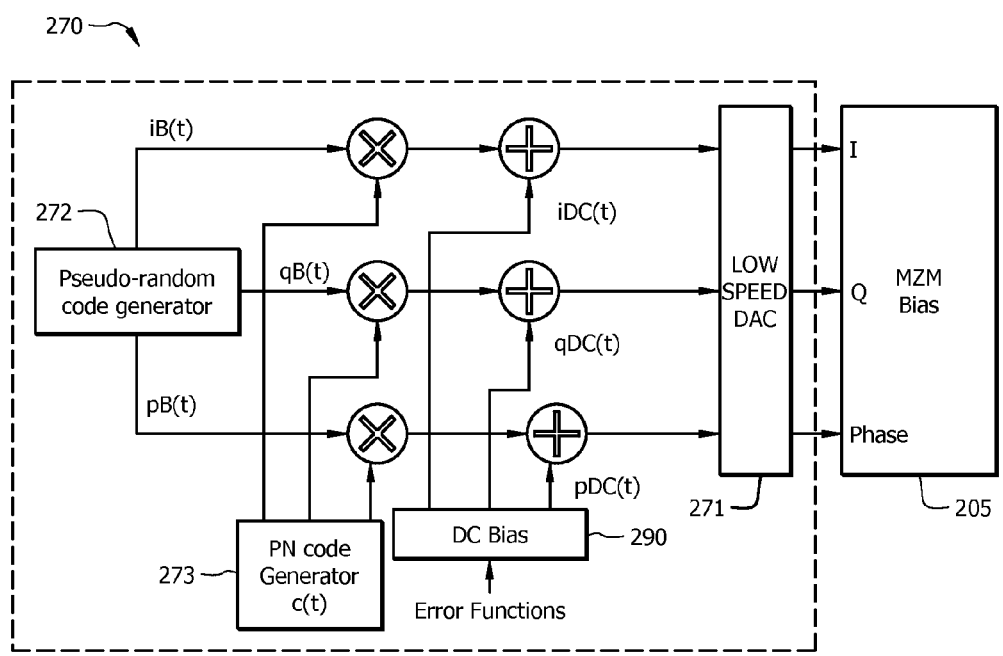
FIG. 2 is a schematic diagram of an embodiment of a DP-MZM bias control signal generation network.
Figure 3:
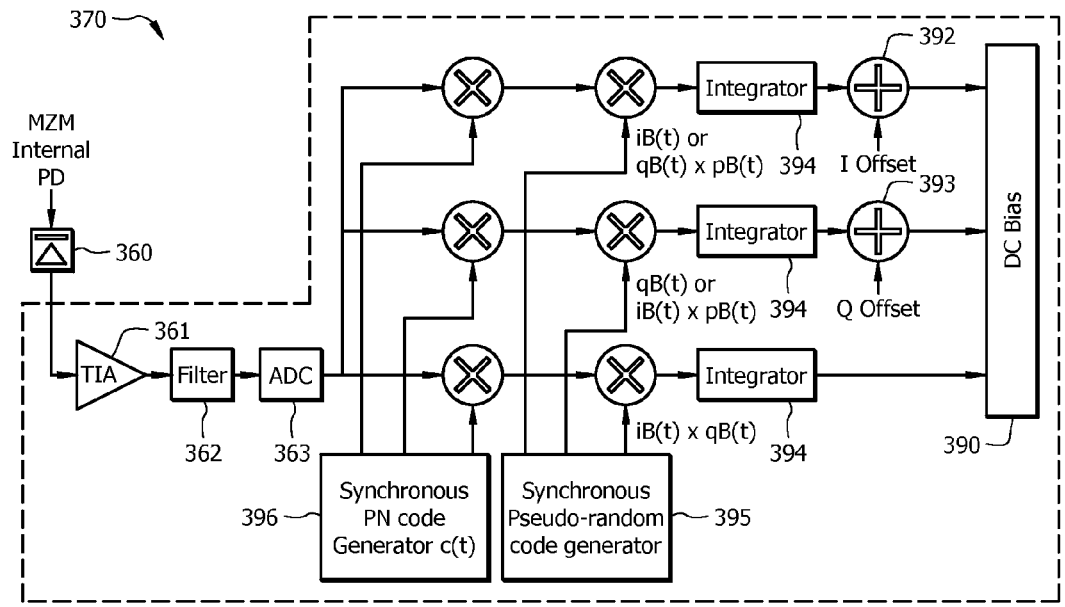
FIG. 3 is a schematic diagram of an embodiment of a DP-MZM bias control signal detection network.

FIGS. 2-3 may describe specific embodiment(s) of bias controller 170. FIG. 2 is a schematic diagram of an embodiment of a DP-MZM bias control signal generation network 270. Network 270 may comprise a pseudo-random code generator 272, a pseudo-noise (PN) code generator 273, and a DC bias component 290. The DC bias component 290 may receive measured optical signals from a DP-MZM (e.g. from a PD such as PD 160). The outputs from code generators 272 and 273 may be combined with the output of component 290, converted to an analog signal via low speed DAC 271, and input into as MZM bias signals to DP-MZM 205, which may be substantially similar to DP-MZM 105.

A pseudo-random code generator 272 may be any device configured to generate a group of orthogonal pseudo-random sequence of codes. An orthogonal pseudo-random code sequence may be any sequence where codes are both orthogonal and pseudo-random. Orthogonal codes may be codes that are non-overlapping, uncorrelated, and/or independent. Pseudo-random codes may be codes that satisfy any test for statistical randomness and are deterministically generated. The pseudo-random code generator 272 may be a module implemented on a DSP, a dedicated circuit, or combinations thereof. The pseudo-random code generator 272 may be configured to generate sequence iB(t) to bias an I MZM, sequence qB(t) to bias a Q MZM, and sequence pB(t) to bias the phase of the I and or Q MZM.

PN code generator 273 may be any device configured to generate PN codes. PN codes may exhibit properties similar to noise, may be statistically random, and may be deterministically generated. PN codes may or may not be orthogonal. It should be noted that PN code generator 273 may add to the random nature of the bias signal, but may not be present in some embodiments. PN code generator 273 may also be implemented as module(s) on a DSP, a dedicated circuit, or combinations thereof.

DC bias component 290 may be any component configured to transmit constant bias sequences DC(t) based on received error functions, for example based on measured output signals from a PD such as PD 160. DC bias component 290 may generate an I component bias iDC(t), a Q component bias qDC(t), and a phase bias pDC(t). Generation of the DC bias sequences may be discussed more fully below. DC bias component 290 may also be implemented as module(s) on a DSP, a dedicated circuit, or combinations thereof.

Pseudo-random code generator 272, PN code generator 273, and DC bias component 290 may each generate an I output, a Q output, and a phase output to be applied to an I modulator, a Q modulator, and phase bias input, respectively. The outputs of the pseudo-random code generator 272 (e.g. iB(t), qB(t), and pB(t)) may be multiplied by the outputs of the PN code generator 273 and the results added to the outputs of the DC bias component 290 (e.g. iDC(t), qDC(t), and pDC(t)) as shown in FIG. 2. The combined outputs of pseudo-random code generator 272, PN code generator 273, and DC bias component 290 may be converted to analog signals by low speed DAC 271 and output from the network 270 for biasing DP-MZM 205.

As shown in FIG. 2, the network 270 may create a unique pseudo-random code for each of I-/Q-/Phase-bias signal at pseudo-random code generator 272. The pseudo-random codes may be orthogonal among each other. The spectrum of the pseudo-random codes may be further spread by multiplying a much longer pseudo noise code from PN code generator 273. Dither/bias signals may be created by adding corresponding DC biases and applied to bias ports of the DP-MZM 205.

FIG. 3 is a schematic diagram of an embodiment of a DP-MZM bias control signal detection network 370. Network 370 may be coupled to and may receive an input signal from an MZM internal PD 360, which may be substantially similar to PD 160. Network 370 may send an output signal to DC bias component 390, which may be substantially similar to DC bias component 290. Network 300 may further comprise a synchronous PN code generator 396 and a synchronous pseudo-random code generator 395, which may be similar to, and employed in addition to, PN code generator 273 and pseudo-random code generator 272. Synchronous PN code generator 396 and a synchronous pseudo-random code generator 395 may be realized with variable delay components, which may take input from a PN code generator such as PN code generator 273 and a pseudo-random code generator such as pseudo-random code generator 272, respectively, and may generate corresponding delayed copies. Network 370 may also comprise an I offset component 392 and a Q offset component 393 configured to adjust bias signals to compensate for ER. Network 300 may acquire MZM output via PD 360, split the output into an I signal, a Q signal, and a phase signal, multiply the signals by orthogonal pseudo-random codes and/or PN codes, offset the I signal and/or the Q signal to account for ER, and forward the signal to the DC bias component 390 for further processing prior to application to DP-MZM (e.f. DP MZM 105 and/or 205) bias ports. DC bias component 390 may also comprise an integrator for each signal (e.g. I, Q, and phase).

A bias control signal detection process for a DP-MZM may be managed by network 370. PD 360 may be configured to detect artifacts in a DP-MZM output that occur, for example, despite the use of dither signal(s). A PD 360 may be employed for each polarization (e.g. X and Y). The photo current measured and/or captured by PD 360 may be amplified via a trans-impedance amplifier (TIA) 361, which may be an operational amplifier based current to voltage converter. The output of the TIA 361 may be filtered by filter 362 to reduce noise and digitized by an ADC 363. The network 370 may extract associated control information by multiplying the digitized signal components (e.g. sequences) with pseudo-random noise sequences c(t) from PN generator 396 and pseudo-random code sequences B(t) from pseudo-random code generator 395. The pseudo-random code generator 395 may generate an I component sequence iB(t) or qB(t)×pB(t), a Q component sequence qB(t) or iB(t)×pB(t), and a phase component sequence iB(t)×qB(t). The resulting signals may be forwarded to integrators 394, which may be low pass filters (LPFs) and may suppress random noise. The resulting signals may be substantially de-randomized upon passing through the integrators.

As noted above, ERs associated with non-ideal MZMs may result in signal errors. ERs associated with MZMs that are configured to perform AWG may be particularly problematic due to the weak nature of the dither signal employed during AWG. I offset component 392 and a Q offset component 393 may be configured to compensate for ER. I offset component 392 and a Q offset component 393 may be any components that may be configured to consistently adjust the I bias signal and Q bias signal, respectively. The offset components 392 and 393 may be programmable. Each DP-MZM may be tested to determine an associated ER, for example during an initial setup of the transmitter and/or as part of a manufacturing process. Offset components 392 and 393 may be programmed to offset the I bias signal and Q bias signal, respectively, to compensate for ER. As ER may be a constant value for each DP-MZM, determining and setting an offset value may only occur once. Optimum offsets may be inversely proportional to the square root of an MZMs ER and may be determined using Equation 1:

$$I \text{ Offset} \propto \frac{1}{\sqrt{ER_Q}} \times \frac{\langle \cos(\frac{\pi}{2} v_{Q,RF}) \rangle}{\langle \cos(\frac{\pi}{2} v_{I,RF}) \rangle}, \text{ and}$$

$$Q \text{ Offset} \propto \frac{1}{\sqrt{ER_I}} \times \frac{\langle \cos(\frac{\pi}{2} v_{I,RF}) \rangle}{\langle \cos(\frac{\pi}{2} v_{Q,RF}) \rangle},$$

Equation 1

In equation 1, $ER_I$ and $ER_Q$ may be extinction ratios of an I modulator and Q modulator of a DP-MZM, respectively. $v_{I,RF}$ and $v_{Q,RF}$ may be the Radio Frequency (RF) driving signals of the I MZM and the Q MZM, respectively, normalized to $v_\pi$. $v_\pi$ may be a driving voltage that may cause a phase shift of $\pi$. For MZM designed for zero chirp applications, the mean value denoted in the numerators may be approximately equal to the mean value denoted in denominator. As such, the offsets may be independent of modulation formats and may determined only by ER and/or power split ratio of couplers (e.g. 3 decibel (dB) couplers) in the MZM. Optimal I- and Q-bias offsets may be readily obtained during factory calibration by minimizing optical carrier power using an optical spectrum analyzer.

The I and Q control signals from the integrators 394 may be routed through the I offset component 392 and a Q offset component 393, respectively, which may add the I and Q offsets to the control signals to compensate for ER. The resulting I, Q, and phase signals may be calculated and/or updated into DC bias voltages at the DC bias component 390 by multiplying by predetermined constants I (KI), Q (KQ), and phase (KP), respectively. The resulting signals may be integrated in DC bias component 390. The integrated signals may be used as DC bias signals, for example in network 270. As with network 270, it should be noted that network 370 may be implemented as modules on a DSP, a dedicated circuit, or combinations thereof.

A Tx 100 comprising networks 270 and/or 370 may experience increased bias control accuracy and stability, especially when employing high-speed DACs to generate arbitrary waveforms. Such a transmitter may be employed to suppress interference with a colored spectrum characteristic and mitigate ER induced performance degradation with associated I and Q bias offsets. Furthermore, due to the orthogonality of the pseudo-random codes, I, Q, and phase bias dithers can be applied and detected substantially simultaneously without significant interference, which can potentially reduce loop response time to track fast events.

Figure 4:
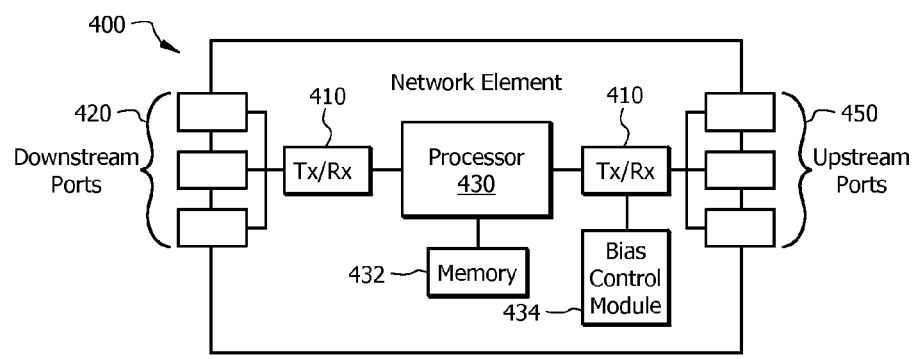
FIG. 4 is a schematic diagram of an embodiment of a transceiver unit.

FIG. 4 is a schematic diagram of an embodiment of a transceiver unit 400, which may be any device that transmits and/or receives optical signals with encoded data. For example, the transceiver unit 400 may be located in an optical transmission system, and may comprise a Tx such as Tx 100 that may comprise networks 270 and/or 370. The transceiver unit 400 may be configured to implement or support any of the schemes described herein. In some embodiments transceiver unit 400 may also act as other node(s) in an optical transport network (OTN), such as an optical line terminal (OLT), an optical network unit (ONU), and/or other optical network elements. One skilled in the art will recognize that the term transceiver unit encompasses a broad range of devices of which transceiver unit 400 is merely an example. Transceiver unit 400 is included for purposes of clarity of discussion, but is in no way meant to limit the application of the present disclosure to a particular transceiver unit embodiment or class of transceiver unit embodiments. At least some of the features/methods described in the disclosure may be implemented in a network apparatus or component such as a transceiver unit 400. For instance, the features/methods in the disclosure may be implemented using hardware, firmware, and/or software installed to run on hardware. The transceiver unit 400 may be any device that transports electrical and/or optical signals through a network, e.g., a switch, router, bridge, server, a client, etc. As shown in FIG. 4, the transceiver unit 400 may comprise transceivers (Tx/Rx) 410, which may be transmitters, receivers, or combinations thereof. A Tx/Rx 410 may be coupled to a plurality of downstream ports 420 (e.g. downstream interfaces) for transmitting and/or receiving frames from other nodes and a Tx/Rx 410 coupled to a plurality of upstream ports 450 (e.g. upstream interfaces) for transmitting and/or receiving frames from other nodes, respectively. A processor 430 may be coupled to the Tx/Rxs 410 to process the data signals and/or determine which nodes to send data signals to. The processor 430 may comprise one or more multi-core processors and/or memory devices 432, which may function as data stores, buffers, etc. Processor 430 may be implemented as a general processor or may be part of one or more application specific integrated circuits (ASICs) and/or digital signal processors (DSPs). The transceiver unit 400 may comprise a bias control module 434, which may be configured to monitor signal sent from modulators in one or more Txs (e.g. Tx/Rxs 410) positioned in transceiver unit 400 and bias such signals as discussed above in Tx 100 and/or networks 270 and/or 370. The bias control module 434 may be implemented as an ASIC, a DSP, a microcontroller, etc. In alternative embodiments, the bias control module 434 may be implemented in processor 430, as instructions stored in memory 432, which may be executed by processor 430, and/or implemented in part in the processor 430 and in part in the memory 432. The downstream ports 420 and/or upstream ports 450 may contain electrical and/or optical transmitting and/or receiving components.

It is understood that by programming and/or loading executable instructions onto the transceiver unit 400, at least one of the processor 430, bias control module 434, Tx/Rxs 410, memory 432, downstream ports 420, and/or upstream ports 450 are changed, transforming the transceiver unit 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
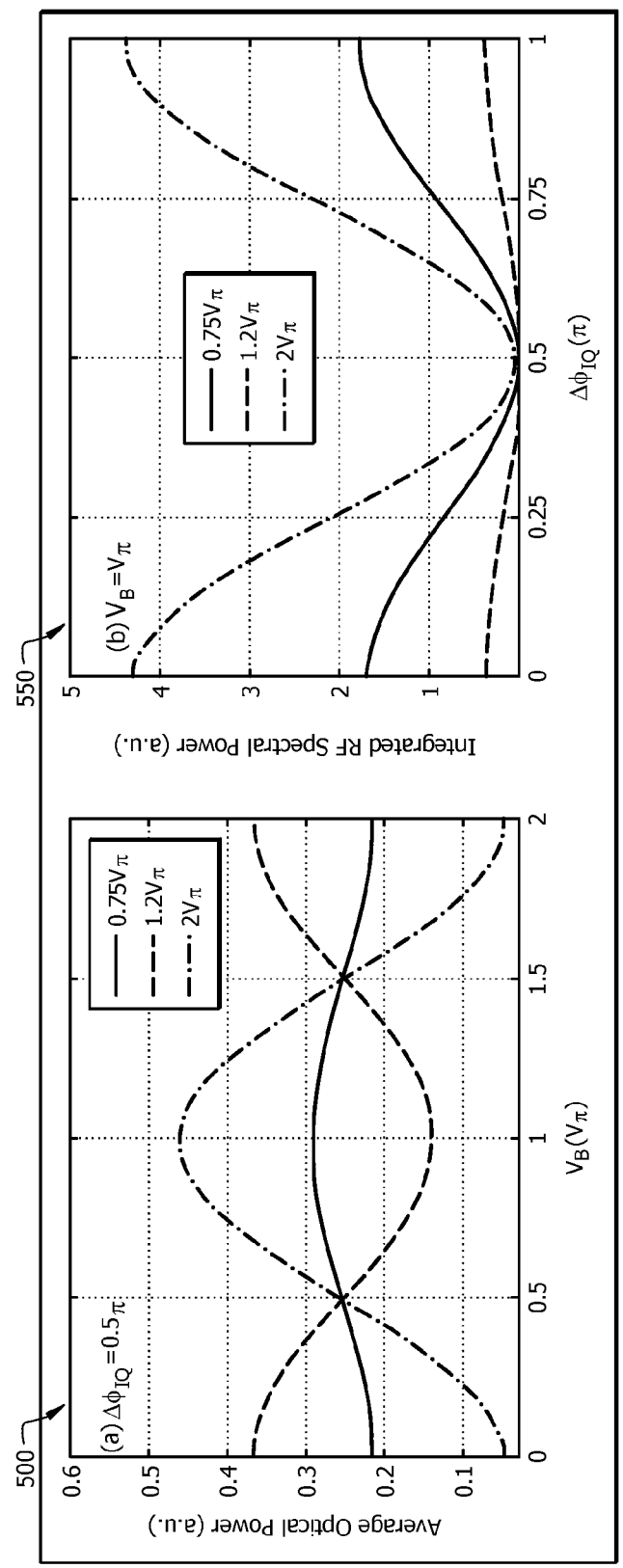
FIG. 5 illustrates graphs of output power versus normalized bias voltages for an embodiment of a DP-MZM.
Figure 8:
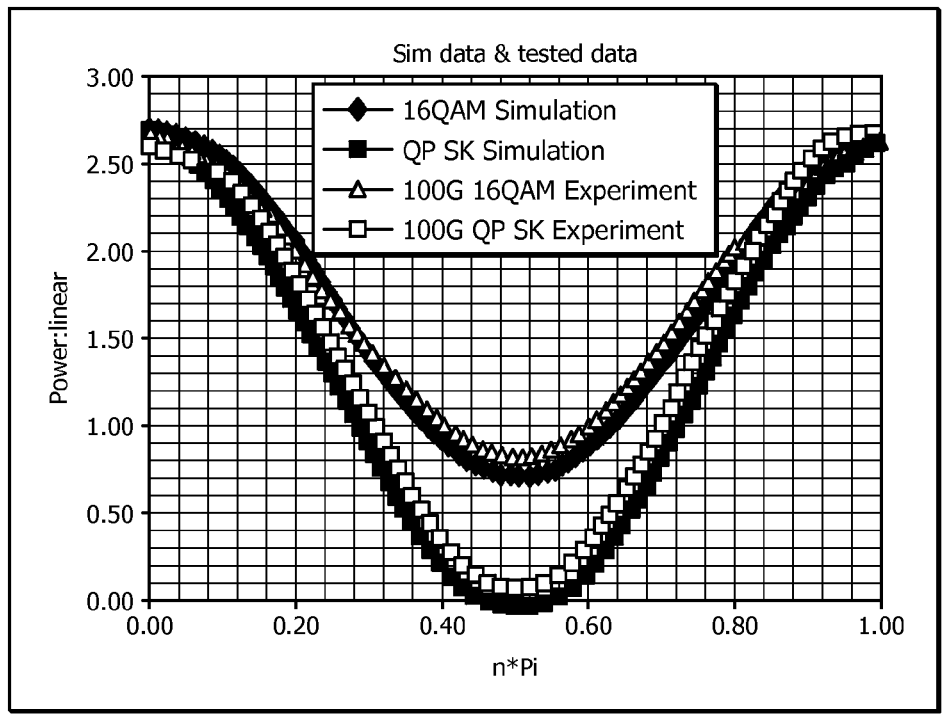
FIG. 8 illustrates a graph of simulated and experimentally determined Radio Frequency (RF) power versus phase bias for a transmitter embodiment with a null bias.

FIG. 5 illustrates graphs of output power versus normalized bias voltages for an embodiment of a DP-MZM. Specifically, graph 500 and 550 may illustrate DP-MZM average output power versus normalized bias voltage DP-MZM integrated RF spectral power versus normalized bias voltage, respectively. The DP-MZM associated with graphs 500 and 550 may employ an automatic bias control scheme for optical QPSK modulation format, in which average optical power is used as I-/Q-bias control signals and RF power is used for phase bias control. As shown in graph 550 RF power may become progressively less sensitive to phase bias variation at low driving levels (e.g. less than $2V_\pi$). AWG with a DP-MZM and high speed DAC may require an effective driving level that is lower than $2V_\pi$. Furthermore, as shown in FIG. 8 below, integrated RF power does not approach to zero at optimal phase bias as two level QPSK signal. As such, bias control stability may be decreased for AWG, which may require increased bias control accuracy. Such increased accuracy may be provided by a DP-MZM 105 biased by a network 270 and/or 370.

Figure 6:
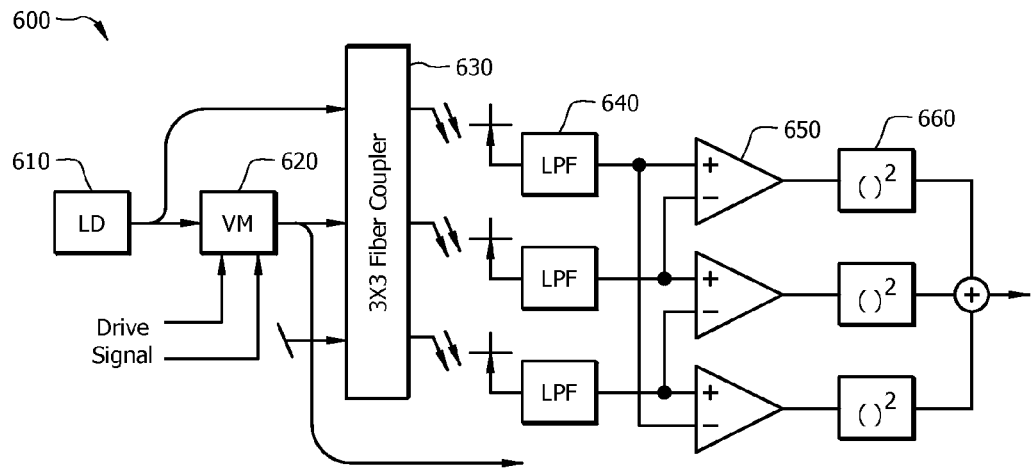
FIG. 6 is a schematic diagram of an embodiment of a homodyne based optical carrier power detection network.
Figure 7:
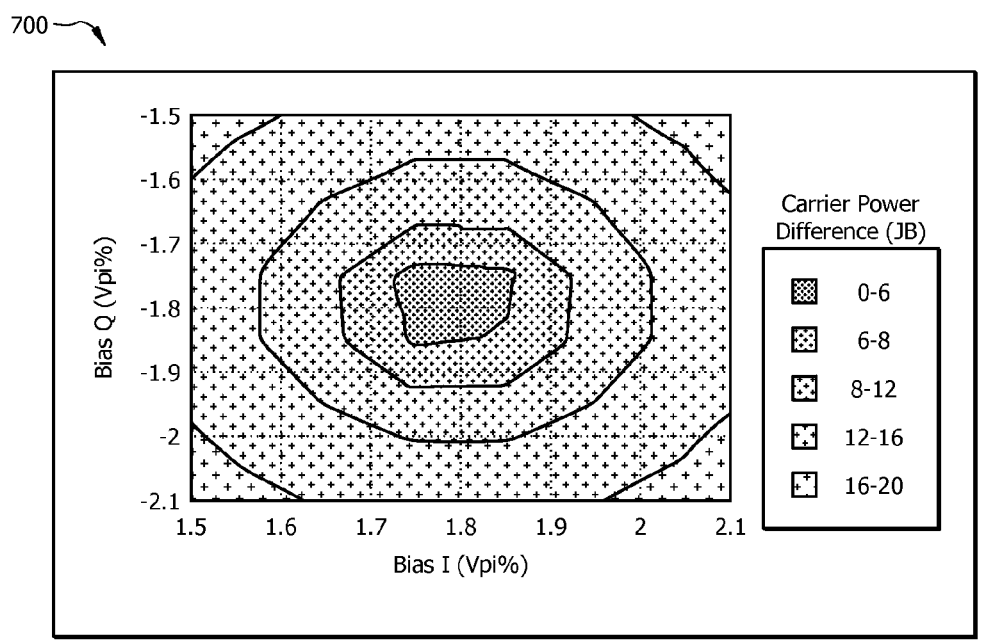
FIG. 7 illustrates a plot of bias accuracy for an embodiment of a homodyne based optical carrier power detection network.

FIG. 6 is a schematic diagram of an embodiment of a homodyne based optical carrier power detection network 600. Network 600 may an alternate solution to the design constraints associated with AWG. Network 600 may comprise a laser diode (LD) 610, configured to emit a light source toward a voltage modulator (VM) 620. The VM 620 may modulate a data signal onto the optical carrier and forward the modulated signal toward a 3×3 coupler 630. The optical carrier may then be forwarded to an LPF 640 and an operational amplifier 650 for noise suppression. The resulting signal may be squared by component 660 and transmitted. Network 600 may utilize homodyne detection based carrier power measurement for I- and Q-bias control. Network 600 may employ the fact that carrier power may be suppressed for an ideal DP-MZM when I- and Q-bias is null. By minimizing carrier power, I- and Q-bias may be maintained at null with high accuracy, as shown in FIG. 7 as discussed below. However, network 600 may require additional optic parts, such as an optical coupler, an optical hybrid and/or 3×3 coupler, and p and n doped semiconductor (PIN) detectors, which may increase implementation cost. Phase bias control in network 600 may be achieved by minimizing integrated RF power in a manner similar to the DP-MZM discussed in reference to FIG. 5. However, as shown in FIG. 8 below, accuracy of phase bias control with integrated RF power may be low for more advanced modulation formats, such as 16-QAM.

FIG. 7 illustrates a plot 700 of bias accuracy for an embodiment of a homodyne based optical carrier power detection network. Graph 700 may illustrate Q bias versus I bias. As shown in FIG. 7, by minimizing carrier power, I- and Q-bias may be maintained at null (e.g. by maintain a bias of about 1.8 $V_\pi$ and $-1.8 V_\pi$, respectively) with high accuracy. However, the accuracy of phase bias control with integrated RF power may be low for more advanced modulation formats, such as 16-QAM.

FIG. 8 illustrates a graph 800 of simulated and experimentally determined RF power versus phase bias for a transmitter embodiment with a null bias. As shown in FIG. 8, experimentally determined and simulated RF power align closely for both QPSK and 16QAM. Furthermore, unlike QPSK, RF power does not approach zero at optimal phase bias in 16QAM applications, which may indicate a requirement of increased bias control accuracy for 16QAM and/or other AWG schemes.

In one automatic bias control method, synchronized square wave dither signals may be applied at I-/Q-bias ports for phase bias control. The dither frequency of Q-bias may be about twice that of I-bias. For I-/Q-bias control, a single square wave dither applied at I-/Q-bias port may be sufficient for accurate bias control. Error signals of I-/Q-/Phase-bias may be defined below based on applied dither.

$$e_I = I(H,0) - I(L,0)$$

$$e_Q = I(0,H) - I(0,L)$$

$$e_P = I(H,H) - I(L,H) - \{I(H,L) - I(L,L)\} \quad \text{Equation 1.}$$

Error signals for I- and Q-bias may be proportional to a 1st order perturbation of optical power variation due to applied dithers, and phase error signals may be proportional to the 2nd order perturbation of optical power variation due to applied dithers. For the null case, bias conditions of DP-MZM may be achieved by adjusting DC biases to drive the defined error functions to zero. The drawback may be that the detected error functions may be susceptible to interference fall in the dither frequencies.

Figure 10:
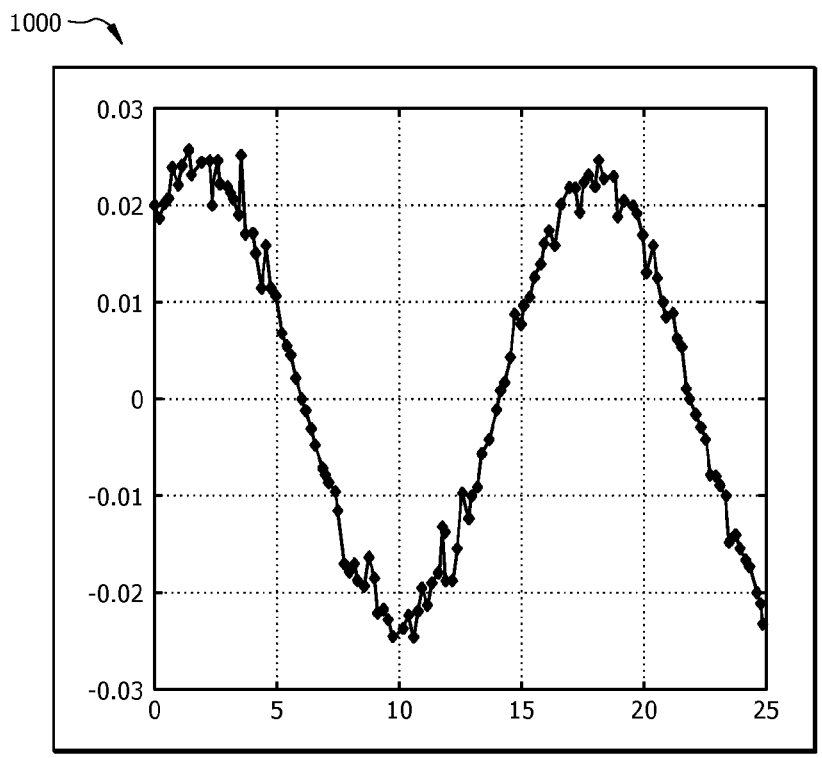
FIG. 10 illustrates a graph of error signals versus bias resulting from a single frequency dither.
Figure 11:
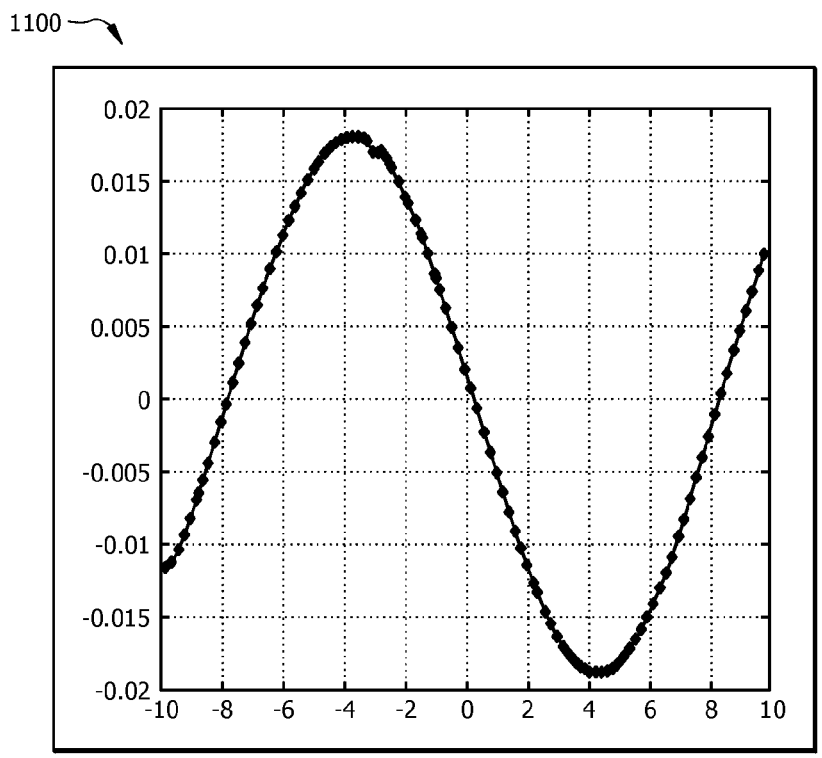
FIG. 11 illustrates a graph of error signals versus bias resulting from a pseudo-random code based dither.

2nd order perturbation may also be employed for I- and Q-bias control, which may maintain the bias at null even for MZMs with limited ER. However, as shown in FIGS. 10-11, offset I-/Q-bias may achieve more optimal BER performance than null bias. Additionally, 2nd order I-/Q-bias control may result in control signals that are more subject to noise and interference in comparison to 1st order I-/Q-bias control.

Figure 9:
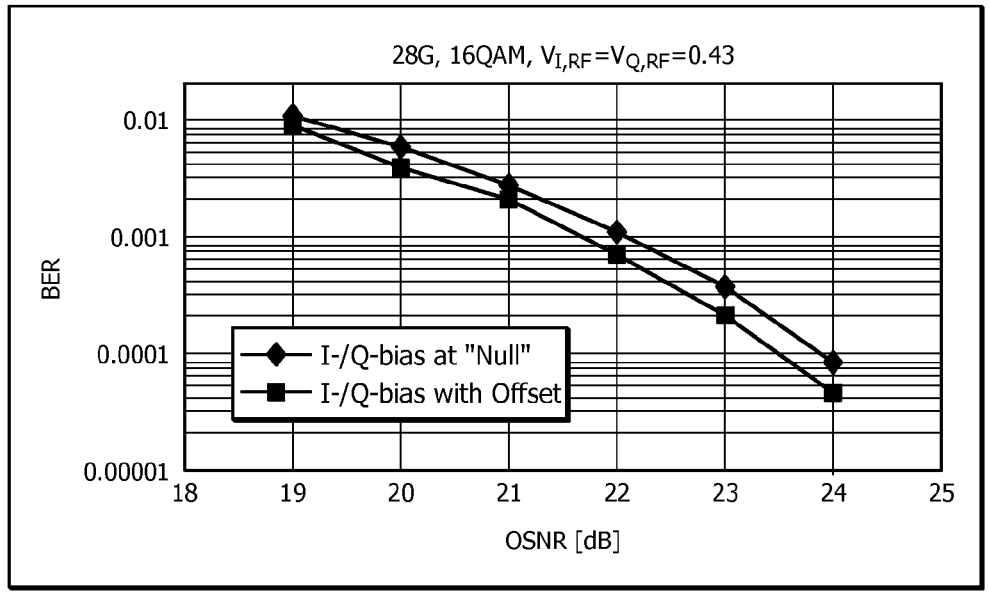
FIG. 9 illustrates a graph of Bit Error Rate (BER) performance with null/quadrature bias and with an offset bias.

FIG. 9 illustrates a graph 900 of BER performance with null/quadrature bias and with an offset bias. As shown in graph 900, an I-Q-bias with an offset may result in a consistently lower BER as optical signal to noise ratio (OSNR) increases, when compared to an I-Q-bias maintained at null.

FIG. 10 illustrates a graph 1000 of error signals versus bias voltage resulting from a single frequency dither. As shown in graph 1000, generation of an arbitrary signal by employing a single frequency dither (e.g. a bias at null) may result in significant signal degradation due to bias control instability.

FIG. 11 illustrates a graph 1100 of error signals versus bias resulting from a pseudo-random code based dither. As shown in graph 1100, generation of an arbitrary signal by employing a pseudo-random code based dither may result in a significant reduction in signal error and/or noise when compared to graph 1000.

As shown above, application of orthogonal pseudo-random codes may effectively suppress interference and improve bias control stability and accuracy, for example, for transmitters using high-speed DAC to generate arbitrary waveforms. Measured control curves are plotted in graphs 1000 and 1100. In comparison to dither signals with a single frequency, the disclosed algorithms show superior tolerance to noise and interference. Robustness of the above mechanisms to starting bias states was tested by randomly choosing initial I-/Q-/phase bias voltages. The control algorithm converged to desired bias voltages for both x- and y-polarization in all 76 test instances.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical transmitter comprising:
  a plurality of Mach-Zehnder modulators (MZMs) configured to modulate analog data signals onto an optical carrier signal for transmission;
  an MZM bias controller coupled to at least one of the MZMs and configured to bias the MZMs with orthogonal pseudo-random code based dither signals to suppress noise associated with operation of the MZMs,
  wherein the MZM bias controller comprises:
    an orthogonal pseudo-random code generator for generating digital signals comprising orthogonal pseudo-random codes;
    a digital to analog converter (DAC) coupled to the orthogonal pseudo-random code generator and an MZM bias controller output and configured to:
      receive the digital signals of orthogonal pseudo-random codes as input; and
      based on the input, output analog signals of the orthogonal pseudo-random codes to an MZM of the plurality of MZMs for use as orthogonal pseudo-random code based dither signals; and
    a pseudo-noise code generator coupled to the DAC, wherein pseudo-noise code signals from the pseudo-noise code generator are combined with the digital signals of orthogonal pseudo-random codes as input to the DAC.

2. The optical transmitter of claim 1, wherein the MZM bias controller further comprises a direct current (DC) bias module for generating offset DC bias signals, wherein the offset DC bias signals are combined with the digital signals of orthogonal pseudo-random codes as input to the DAC.

3. The optical transmitter of claim 2, wherein the MZMs comprise an In-phase (I) MZM and a Quadrature-phase (Q) MZM, wherein the DC bias module comprises an I offset module and a Q offset module, wherein the I offset module and the Q offset module each:
  receive control signals;
  offset the received control signals by a value selected to mitigate crosstalk between the I MZM and Q MZM associated with a finite extinction ratio; and forward the offset control signals toward the DAC as offset DC bias signals.

4. The optical transmitter of claim 3, further comprising an optical receiver configured to:
receive a portion of the optical carrier signal transmitted from the MZMs; and
forward the optical carrier signal portion toward the I offset module and the Q offset module.

5. The optical transmitter of claim 4, further comprising a synchronous orthogonal pseudo-random code generator for generating a synchronous signal of orthogonal pseudo-random codes, wherein the synchronous signal of orthogonal pseudo-random codes are combined with the optical carrier signal portion to generate the control signals.

6. The optical transmitter of claim 5, further comprising a synchronous pseudo-noise code generator for generating a synchronous pseudo-noise code signal, wherein the optical carrier signal portion is further combined with the synchronous pseudo-noise code signal to generate the control signals.

7. A method comprising:
generating an In-phase (I) bias signal by:
receiving a measured I portion of a control signal from an I Mach-Zehnder modulator (MZM);
offsetting the I portion of the control signal by an I offset;
applying an I dither signal to the I portion of the control signal, wherein the I dither signal is based on orthogonal pseudo-random codes; and
apply a pseudo-noise code signal to the I portion of the control signal;
generating a Quadrature-phase (Q) bias signal by:
receiving a measured Q portion of the control signal from a Q MZM;
offsetting the Q portion of the control signal by a Q offset;
applying a Q dither signal to the Q portion of the control signal, wherein the Q dither signal is based on the orthogonal pseudo-random codes; and
apply a pseudo-noise code signal to the Q portion of the control signal;
applying the I bias signal to the I MZM;
applying the Q bias signal to the Q MZM; and
performing arbitrary waveform generation (AWG) by modulating an analog data signal onto an optical carrier signal via the I and Q MZMs,
wherein the I offset and the Q offset are selected to mitigate crosstalk between the I MZM and the Q MZM due to a finite extinction ratio.

8. The method of claim 7, wherein the optical carrier signal is split between the Q MZM and the I MZM, wherein the finite extinction ratio describes the ratio of the optical carrier signal received by each MZM, and wherein the finite extinction ratio is a result of MZM manufacturing process imperfections.

9. The method of claim 7, further comprising:
generating a phase bias signal by:
receiving a measured phase portion of the control signal from at least one of the MZMs; and
applying a phase dither signal to the phase portion of the control signal, wherein the phase dither signal is based on the orthogonal pseudo-random codes; and
applying the phase bias signal to at least one of the I and Q MZMs.

10. The method of claim 9, wherein the phase portion of the control signal, when generating the phase bias signal, is absent an offset.

11. The method of claim 9, wherein the I offset is described by the equation:

$$I \text{ Offset} \propto \frac{1}{\sqrt{ER_Q}} \times \frac{\langle \cos(\frac{\pi}{2} v_{Q,RF}) \rangle}{\langle \cos(\frac{\pi}{2} v_{I,RF}) \rangle},$$

wherein $ER_Q$ is an extinction ratio of the Q MZM, $v_{Q,RF}$ is a driving signal of the Q MZM normalized to $v_\pi$, $v_{I,RF}$ is a driving signal of the I MZM normalized to $v\pi$, and $v\pi$ is a driving voltage that causes a phase shift of $\pi$ in the Q portion.

12. The method of claim 9, wherein the Q offset is described by the equation:

$$Q \text{ Offset} \propto \frac{1}{\sqrt{ER_I}} \times \frac{\langle \cos(\frac{\pi}{2} v_{I,RF}) \rangle}{\langle \cos(\frac{\pi}{2} v_{Q,RF}) \rangle},$$

wherein $ER_I$ is an extinction ratio of the I MZM, $v_{Q,RF}$ is a driving signal of the Q MZM normalized to $v_\pi$, $v_{I,RF}$ is a driving signal of the I MZM normalized to $v\pi$, and $v\pi$ is a driving voltage that causes a phase shift of $\pi$ in the Q portion.

13. An Mach-Zehnder modulator (MZM) bias controller comprising:
an input port configured to receive a control signal from a detector associated with an MZM output;
a processing unit coupled to the input port and configured to:
obtain In-phase (I), Quadrature-phase (Q), and phase component from the received control signal;
apply an I offset to the I component of the control signal;
apply a Q offset to the Q component of the control signal; and
apply at least one orthogonal pseudo-random code based dither signal to the I component, the Q component, and the phase component of the control signal;
apply a pseudo-noise code signal to the I component, the Q component, and the phase component of the control signal; and
one or more output ports coupled to the processing unit and configured to:
bias an I MZM with the I component of the control signal;
bias a Q MZM with the Q component of the control signal; and
bias an output of at least one of the I and Q MZMs with the phase component of the control signal.

14. The MZM bias controller of claim 13, wherein the at least one orthogonal pseudo-random code based dither signal is selected to maintain MZM accuracy during modulation of arbitrary waveforms for transmission across an optical medium.

15. The MZM bias controller of claim 13, wherein the at least one orthogonal pseudo-random code based dither signal is selected to maintain accuracy during modulation of data signals that are pre-compensated for optical medium limitations.

16. The MZM bias controller of claim 13, wherein the I offset is described by the equation:

$$I \text{ Offset} \propto \frac{1}{\sqrt{ER_Q}} \times \frac{\langle \cos(\frac{\pi}{2} v_{Q,RF}) \rangle}{\langle \cos(\frac{\pi}{2} v_{I,RF}) \rangle},$$

wherein $ER_Q$ is an extinction ratio of the Q MZM, $v_{Q,RF}$ is a driving signal of the Q MZM normalized to $v\pi$, $v_{I,RF}$ is a driving signal of the I MZM normalized to $v\pi$, and $v\pi$ is a driving voltage that causes a phase shift of $\pi$ in a Q component of a modulated signal.

17. The MZM bias controller of claim 13, wherein the Q offset is described by the equation:

$$Q \text{ Offset} \propto \frac{1}{\sqrt{ER_I}} \times \frac{\langle \cos(\frac{\pi}{2} v_{I,RF}) \rangle}{\langle \cos(\frac{\pi}{2} v_{Q,RF}) \rangle},$$

wherein $ER_I$ is an extinction ratio of the I MZM, $v_{Q,RF}$ is a driving signal of the Q MZM normalized to $v\pi$, $v_{I,RF}$ is a driving signal of the I MZM normalized to $v\pi$, and $v\pi$ is a driving voltage that causes a phase shift of $\pi$ in a Q component of a modulated signal.

\* \* \* \* \*